US012784453B2

(12) United States Patent
Hetani

(10) Patent No.: US 12,784,453 B2
(45) Date of Patent: Nov. 3, 2026

(54) RECORDING CONTROL APPARATUS

(71) Applicant: JVCKENWOOD Corporation, Yokohama (JP)

(72) Inventor: Hidenori Hetani, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

(21) Appl. No.: 19/073,725

(22) Filed: Mar. 7, 2025

(65) Prior Publication Data

US 2025/0209816 A1 Jun. 26, 2025

Related U.S. Application Data

(63) Continuation-in-part of application No. PCT/JP2023/021954, filed on Jun. 13, 2023.

(30) Foreign Application Priority Data

Sep. 22, 2022 (JP) ................................ 2022-151831

(51) Int. Cl.
*H04N 7/18* (2006.01)
*G06V 20/17* (2022.01)
*G06V 20/40* (2022.01)

(52) U.S. Cl.
CPC .............. *G06V 20/44* (2022.01); *G06V 20/17* (2022.01)

(58) Field of Classification Search
CPC ........... H04N 7/18; G06V 20/44; G06V 20/17
USPC .......................................................... 348/148
See application file for complete search history.

(56) References Cited

U.S. PATENT DOCUMENTS 11,961,395 B2 * 4/2024 Ogata .................. G08G 1/0133
12,017,766 B2 * 6/2024 Myer ................... B64U 30/296
12,344,407 B2 * 7/2025 Ramezani .............. B64U 60/60
2020/0023701 A1 1/2020 Salem
2023/0120235 A1 4/2023 Atsumo

FOREIGN PATENT DOCUMENTS

JP 2022-003750 A 1/2022
JP 2022136534 A * 9/2022 ............... G07C 5/00

OTHER PUBLICATIONS

International Search Report in International Application No. PCT/JP2023/021954—ISA/JP—Mailed on Jul. 18, 2023—5pgs.
Written Opinion in International Application No. PCT/JP2023/021954—ISA/JP—Mailed on Jul. 18, 2023—3pgs.

* cited by examiner

*Primary Examiner* — Trang U Tran
(74) *Attorney, Agent, or Firm* — PROCOPIO, CORY, HARGREAVES & SAVITCH LLP

(57) ABSTRACT

A recording control apparatus according to an embodiment includes: a video image data acquisition unit configured to acquire video image data obtained by capturing an image of an area including a periphery of a mobile body which flies and travels on land; an event detection unit configured to detect an event that has occurred and record the video image data at a time of the detection of the event as event video image data in a recording unit in accordance with a predetermined condition; and a condition change unit configured to change the predetermined condition depending on whether the mobile body is traveling or flying.

6 Claims, 4 Drawing Sheets

RECORDING CONTROL APPARATUS

CROSS REFERENCE TO RELATED APPLICATION

This application is a Continuation-In-Part of PCT Application No. PCT/JP2023/021954, filed on Jun. 13, 2023, and claims the benefit of priority from Japanese patent application No. 2022-151831, filed on Sep. 22, 2022, the disclosure of which is incorporated herein in its entirety by reference.

The present disclosure relates to a recording control apparatus etc.

BACKGROUND

Patent Literature 1 discloses a dashboard camera that records video image data when an event has occurred. In this dashboard camera, video image data is recorded in an external recording medium in synchronization with events such as an impact detected by an acceleration sensor and the like.

[Patent Literature 1] Japanese Unexamined Patent Application Publication No. 2022-3750

SUMMARY

In recent years, vehicles capable of flying such as flying cars have been developed. When a mobile body such as a flying car is put to a practical and commercial use, there is a possibility that a dashboard camera will be installed in it. When a dashboard camera is installed in such a mobile body, it will be difficult to record an appropriate event video image since an event cannot be detected appropriately during flight.

In view of the problem described above, an object of the present disclosure is to provide a recording control apparatus etc. capable of appropriately recording event video image data.

A recording control apparatus according to an embodiment includes: a video image data acquisition unit configured to acquire video image data obtained by capturing an image of an area including a periphery of a mobile body which flies and travels on land; an event detection unit configured to detect an event that has occurred and record the video image data at a time of the detection of the event as event video image data in a recording unit in accordance with a predetermined condition; and a condition change unit configured to change the predetermined condition depending on whether the mobile body is traveling or flying.

A recording control apparatus according to an embodiment includes: a video image data acquisition unit configured to acquire video image data obtained by capturing an image of an area including a periphery of a mobile body which flies; an event detection unit configured to detect an event that has occurred and record the video image data at a time of the detection of the event as event video image data in a recording unit in accordance with a predetermined condition; and a condition change unit configured to change the predetermined condition depending on whether the mobile body is flying or engaged in a takeoff and landing operation.

A recording control apparatus according to an embodiment includes: a video image data acquisition unit configured to acquire video image data obtained by capturing an image of an area including a periphery of a mobile body which flies and travels on land; an event detection unit configured to detect an event that has occurred and record the video image data at a time of the detection of the event as event video image data in a recording unit in accordance with a predetermined condition; and a condition change unit configured to change the predetermined condition depending on whether the mobile body is traveling, flying, or engaged in a takeoff and landing operation.

According to an embodiment, it is possible to provide a recording control apparatus etc. capable of appropriately recording event video image data.

DETAILED DESCRIPTION

Embodiments of the present disclosure will be described below with reference to the drawings. Note that, in order to clarify the description, the following descriptions and the drawings are partially omitted and simplified as appropriate. Further, the same elements and similar elements are denoted by the same reference symbols throughout the drawings, and redundant descriptions are omitted as necessary.

Figure 1:
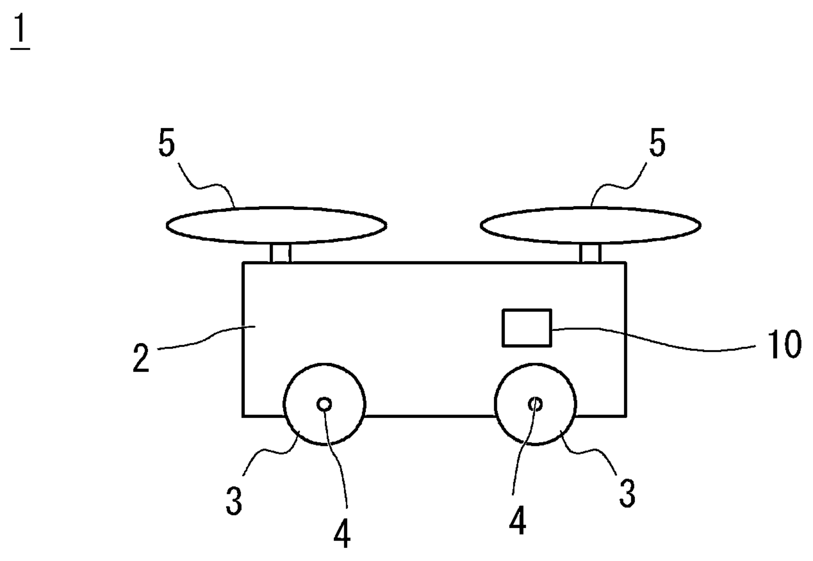
FIG. 1 is a diagram schematically showing a mobile body on which a recording apparatus is mounted.

A recording control apparatus and a recording apparatus according to this embodiment are mounted on a mobile body capable of flying such as a flying motorcycle or a flying car. For example, a mobile body is an air vehicle capable of autonomously traveling on land. In other words, a mobile body is an air vehicle capable of traveling on the ground. FIG. 1 is a diagram schematically showing a mobile body 1 on which a recording apparatus is mounted.

The mobile body 1 includes a vehicle body 2, wheels 3, axles 4, rotary wings (i.e. rotor blades) 5, etc. The vehicle body 2 holds the wheels 3, the axles 4, and the rotary wings 5. A plurality of the wheels 3 are attached to the vehicle body 2 through the axles 4. That is, a driving mechanism such as a motor drives the axles 4, to thereby rotate the wheels 3. The vehicle body 2 rotatably holds a plurality of the rotary wings 5. For example, a driving mechanism such as a motor drives the rotary wings 5. Further, seats, operation means, etc. (not shown) are provided in the vehicle body 2.

A driving mechanism (not shown) for rotating the axles 4 and the rotary wings 5 are provided in the vehicle body 2. Further, the vehicle body 2 includes a battery (not shown) for driving a motor and a drive control apparatus (not shown) that performs a drive control. The mobile body 1 travels on the ground by rotating the wheels 3 in contact with the ground. Further, the mobile body 1 flies by rotating the rotary wings 5. Note that the mobile body 1 may be an electric vertical takeoff and landing aircraft. Further, at least one of the rotary wing 5 and the wheel 3 is not limited to being driven by an electric motor and may instead be driven by an engine. Note that the number of the rotary wings 5 and the number of the wheels 3 are not limited to particular numbers.

Further, a recording apparatus 10 is mounted on the vehicle body 2. The recording apparatus 10 is, for example, a dashboard camera, and records a video image of an area including the periphery of the mobile body 1. That is, the recording apparatus 10 can record each of a video image when the mobile body 1 is traveling, a video image when the mobile body 1 is taking off and landing, and a video image when the mobile body 1 is flying.

Figure 2:
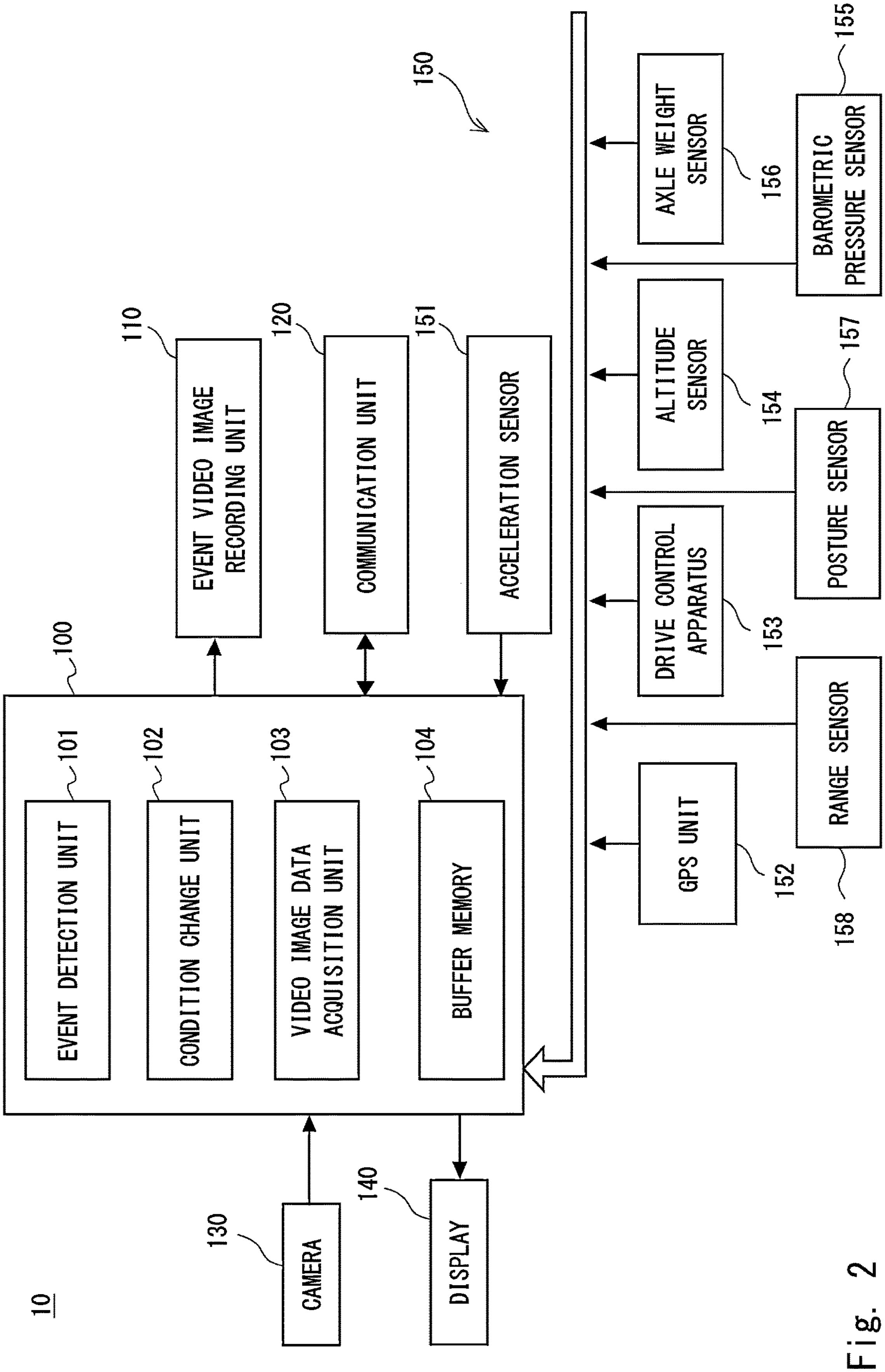
FIG. 2 is a block diagram showing a control system of the recording apparatus and a recording control apparatus.

FIG. 2 is a control block diagram showing a configuration of the recording apparatus 10. The recording apparatus 10 includes a recording control apparatus 100, an event video image recording unit 110, a communication unit 120, a camera 130, a display 140, and a sensor unit 150.

The recording control apparatus 100 is a control apparatus including a Central Processing Unit (CPU), a Graphics Processing Unit (GPU), a memory, and a circuit board on which a plurality of interfaces etc. are mounted. The recording control apparatus 100 is a computer an executes a program stored in the memory, thereby executing various type of processing. The recording control apparatus 100 includes an event detection unit 101, a condition change unit 102, a video image data acquisition unit 103, and a buffer memory 104.

The sensor unit 150 is used by the event detection unit 101 of the recording control apparatus 100 to determine a state of the mobile body 1. For example, the event detection unit 101 determines whether the mobile body 1 is flying or traveling on the ground based on sensor information from the sensor unit 150. Further, the event detection unit 101 determines whether or not the mobile body 1 is taking off and landing based on information from the sensor unit 150. Further, as described later, the sensor unit 150 may be used to detect an event that has occurred in the mobile body 1.

The sensor unit 150 includes one or a plurality of sensors. For example, the sensor unit 150 includes an acceleration sensor 151, a GPS unit 152, a drive control apparatus 153, an altitude sensor 154, a barometric pressure sensor 155, an axle weight sensor 156, a posture sensor 157, and a range sensor 158. These sensors will be described later.

Note that various types of sensors provided in the sensor unit 150 are not limited to those shown in the figure. Therefore, the sensor unit 150 may include sensors other than those shown in the figure, and may not include one or more of the sensors shown in the figure.

The communication unit 120 has a radio communication function and performs radio communication with a ground base station. Thus, it is possible to transmit to and receive data from the ground base station that performs air traffic control. Alternatively, the communication unit 120 may perform radio communication with other mobile bodies or communication terminals present in the periphery of the mobile body 1. The communication unit 120 includes a communication module such as Wi-Fi (registered trademark) or Bluetooth (registered trademark). Alternatively, the communication unit 120 may include a radio communication module for mobile phone communication such as 4G Long Term Evolution (LTE) or 5G. Further, the communication unit 120 may include a communication module such as a Very High Frequency (VHF) radio device, a High Frequency (HF) radio device, or an Ultra High Frequency (UHF) radio device for air traffic control. The communication unit 120 may include two or more communication modules so that communication can be performed by different communication standards.

The camera 130 is an image capturing apparatus that captures an image of an area including the periphery of the mobile body 1. For example, the camera 130 is disposed in the vehicle body 2 and captures a video image of an area in front of the mobile body 1. Note that the camera 130 may capture not only a video image of an area in front of the mobile body 1, but also a video image of an area on the sides of the mobile body 1, a video image of an area behind the mobile body 1, and a video image of a vehicle interior of the mobile body 1. Further, the mobile body 1 may include two or more cameras 130. The camera 130 is, for example, a camera including an image pickup device such as a Charge-Coupled Device (CCD) image sensor or a Complementary Metal Oxide Semiconductor (CMOS) image sensor.

The display 140 includes a display apparatus installed in a dashboard or the like, and presents various types of information to a driver. The display 140 includes, for example, a liquid crystal panel or an organic Electro Luminescence (EL) panel. The display 140 displays map information and the like necessary for navigation. For example, the display 140 may display the route, the time, and the distance to a destination. The display 140 may display the current position, the speed, and the direction of the mobile body 1. The display 140 may also display a moving image captured by the camera 130. The display 140 may be mounted on a car navigation system or a dashboard camera. Further, input means such as a touch panel or operation buttons may be provided in the display 140.

Next, the sensors provided in the sensor unit 150 will be described. The acceleration sensor 151 detects acceleration of the mobile body 1. The acceleration sensor 151 outputs acceleration information indicating the acceleration to the recording control apparatus 100. Further, the acceleration sensor 151 may be a three-dimensional acceleration sensor.

The Global Positioning System (GPS) unit 152 functions as a position sensor that detects the current position of the mobile body 1 based on a GPS signal. The GPS unit 152 outputs position information indicating the position of the mobile body 1 to the recording control apparatus 100. The position information includes information about the latitude and the longitude of the mobile body 1. Further, the position information may include information about the altitude. Note that the GPS unit 152 may use data received from a satellite positioning system other than the GPS.

The drive control apparatus 153 detects drive information related to the drive of the mobile body 1. The drive control apparatus 153 comprises, for example, a control apparatus including a Central Processing Unit (CPU), a Graphics Processing Unit (GPU), a memory, and a circuit board on which a plurality of interfaces etc. are mounted. The drive control apparatus 153 outputs the drive information to the recording control apparatus 100. The drive control apparatus 153 outputs accelerator opening information indicated by an accelerator opening sensor and vehicle speed information indicated by a vehicle speed sensor as the drive information. Further, the drive control apparatus 153 outputs a vehicle speed pulse value indicating the number of rotations of the axle 4 as the drive information. The drive control apparatus 153 may detect the drive information by using encoders of the motors of the wheels 3 and the rotary wings 5 and the like. For example, the encoder detects the number of rotations and the rotational speed of the motors of the wheels 3 and the rotary wings 5. Thus, the recording control apparatus 100 can acquire the drive information indicating the moving speed of the mobile body 1 and the like.

The barometric pressure sensor 155 detects a barometric pressure near the mobile body 1. Then the barometric pressure sensor 155 outputs barometric pressure information indicating the barometric pressure to the recording control apparatus 100. Note that the barometric pressure sensor 155 and the altitude sensor 154 may be a common sensor. For example, the event detection unit 101 of the recording control apparatus 100 may convert the barometric pressure measured by the barometric pressure sensor 155 to an altitude.

The altitude sensor 154 detects an altitude of the mobile body 1. Then the altitude sensor outputs altitude information indicating the altitude of the mobile body 1 to the recording control apparatus 100. Further, the altitude sensor 154 and the barometric pressure sensor 155 may be sensors using a Micro Electro Mechanical Systems (MEMS) device. Further, the event detection unit 101 of the recording control apparatus 100 may convert the barometric pressure detected by the barometric pressure sensor 155 to an altitude. Further, the event detection unit 101 of the recording control apparatus 100 can detect a change in the altitude with high accuracy by using the altitude acquired by the GPS unit 152 and the altitude detected by the barometric pressure sensor.

The axle weight sensor 156 is a weight sensor that detects a weight of the axles 4. For example, the axle weight sensor 156 detects the load received by the vehicle body 2 from the axles 4 and outputs weight information indicating the weight of the axles 4 to the recording control apparatus 100.

The posture sensor 157 is a gyro sensor that detects a posture of the mobile body 1. The posture sensor 157 can detect a three-dimensional posture of the mobile body 1. The posture sensor 157 outputs posture information indicating the posture of the mobile body 1 to the recording control apparatus 100.

The range sensor 158 is a LIDAR (Light Detection and Ranging, Laser Imaging Detection and Ranging) or the like, and measures a distance from the mobile body 1 to an object present in the periphery of the mobile body 1. The range sensor 158 can measure a distance from the mobile body 1 to a vehicle traveling in the periphery of the mobile body 1 and to an air vehicle flying in the periphery of the mobile body 1. Thus, the range sensor 158 outputs range information indicating the distance from the mobile body 1 to a nearby object (i.e., an object present in the periphery of the mobile body 1) to the recording control apparatus 100.

Next, the recording control apparatus 100 will be described. The video image data acquisition unit 103 acquires video image data captured by the camera 130. Further, the video image data acquisition unit 103 may, for example, compress video image data. Further, the video image data acquisition unit 103 may add information such as the date and time when and the place where video image data is captured to the video image data.

The buffer memory 104 is a volatile or non-volatile memory apparatus. The buffer memory 104 sequentially receives video image data periodically generated by the camera 130 through the video image data acquisition unit 103, and temporarily stores the received video image data. The video image data temporarily stored by the buffer memory 104 is data for a preset period of time. The buffer memory 104 sequentially erases video image data after a preset period of time has elapsed, or sequentially overwrites it with newly received video image data. That is, the buffer memory 104 functions as a ring buffer. The video image data after a certain period of time has elapsed is overwritten, and therefore is not stored in the buffer memory 104. The period of time during which the buffer memory 104 stores the above video image data is determined by the capacity of the buffer memory 104, the quality of the video image, etc. Recording performed by the buffer memory 104 is a cyclic recording or a constant recording.

The event detection unit 101 detects an event based on sensor information from various types of sensors. For example, the event detection unit 101 detects a sudden impact or the like as an event. The recording control apparatus 100 has a function of recording, by using the impact as a trigger, video image data for a preset period of time as "event video image data" so that it can be reproduced. The event video image data is an image capturing file including a flag in the file, the flag indicating that overwriting or erasing is prohibited. A driver or the like of the mobile body 1 can know the state of an event by reproducing video image data of the event and then looking at the video image of the reproduced event video image data. The event detection unit 101 detects an event in accordance with a preset event detection condition. For example, when sensor information from the sensor unit 150 matches a predetermined event detection condition, the event detection unit 101 detects the occurrence of an event.

For example, when the event detection unit 101 detects an event, the event detection unit 101 causes the event video image recording unit 110 to record an image capturing file for a preset period of time in accordance with the detection of the event as event video image data which is prohibited to be overwritten. The event detection unit 101 causes the event video image recording unit 110 to store the event video image data in a predetermined recording area in the event video image recording unit 110. The predetermined recording area is, for example, a recording area specifying that overwriting or erasing is prohibited. Alternatively, the event video image data supplied to the event video image recording unit 110 by the event detection unit 101 may be stored so that it includes a flag indicating that overwriting or erasing is prohibited in the file. The event video image data supplied to the event video image recording unit 110 by the event detection unit 101 is stored as a file including a flag, and it is stored in a recording area specifying that overwriting or erasing is prohibited based on the flag, or managed as a file in which overwriting or erasing is prohibited.

Note that processing in which the event detection unit 101 causes the event video image recording unit 110 to record event video image data is referred to as "event recording". Thus, the event video image data is recorded in a recording area which is different from a normal recording area (the buffer memory 104) and which is not overwritten. Therefore, the event video image recording unit 110 can record video image data as circumstantial evidence when an accident or the like has occurred in a recording area which is not overwritten.

The event detection unit 101 detects an event in accordance with an event detection condition. That is, when sensor information from the sensor unit 150 matches an event detection condition, it is determined that an event has occurred. The event detection condition is a predetermined condition for detecting an event related to the mobile body 1 and the periphery of the mobile body 1. Then the event detection unit 101 writes a video image for a certain period of time including the occurrence of the event as an event video image to the event video image recording unit 110. When the event detection unit 101 does not detect an event, a video image is not written to the event video image recording unit 110.

Note that the event video image recording unit 110 is a recording apparatus that stores event video image data. The event video image recording unit 110 is, for example, a non-volatile recording apparatus such as a memory card including a flash memory, a Solid State Drive (SSD), or a Hard Disc Drive (HDD). The event video image recording unit 110 is connected to the recording control apparatus 100, receives predetermined data from the recording control apparatus 100, and records the received data. The event video image recording unit 110 may be configured so that it is detachable from the recording control apparatus 100 or so that it is not detachable from the recording control apparatus 100. For example, when a detachable memory card or the like is used, an interface such as a card slot may be mounted on the recording control apparatus 100. That is, a memory that records video image data may be provided separately from the recording control apparatus 100 and the recording apparatus 10.

The condition change unit 102 changes an event detection condition used in the event detection unit 101. More specifically, the condition change unit 102 determines a state of the mobile body 1. Then the condition change unit 102 changes the event detection condition in accordance with the state of the mobile body 1.

For example, the condition change unit 102 determines whether the mobile body 1 is flying or traveling. Flying indicates a state in which the mobile body 1 is flying in the air. That is, during flying, the wheels 3 are not in contact with a road surface. On the other hand, traveling indicates a state in which the mobile body 1 is traveling on a road surface. That is, during traveling, the wheels 3 are in contact with a road surface.

Further, the condition change unit 102 determines whether or not the mobile body 1 is taking off and landing. Taking off and landing is a state including taking off and landing. Landing indicates a transient operating state from flying to traveling. For example, during landing, a distance between the mobile body 1 and the ground is less than a predetermined distance, and the vehicle body 2 is gradually approaching the ground. Specifically, during landing, a distance between the mobile body 1 and the ground is less than a predetermined distance, and the altitude of the vehicle body 2 from the ground tends to decrease for a certain period of time. Taking off indicates a transient operating state from traveling to flying. For example, during taking off, a distance between the mobile body 1 and the ground is less than a predetermined distance, and the vehicle body 2 is gradually separated from the ground. Specifically, during taking off, a distance between the mobile body 1 and the ground is less than a predetermined distance, and the altitude of the vehicle body 2 from the ground tends to increase for a certain period of time. During taking off and landing, for example, although the wheels 3 are in contact with a road surface, lift (a rotor thrust) is generated by the rotary wings 5.

The condition change unit 102 determines a state of the mobile body 1 by using sensor information from the sensor unit 150. For example, the condition change unit 102 can determine a state of the mobile body 1 based on at least one of position information, drive information, altitude information, barometric pressure information, weight information, posture information, and range information. Further, the condition change unit 102 can determine a movement state more accurately by using information from a plurality of sensors.

For example, the condition change unit 102 compares the actual moving speed of the mobile body 1 with an assumed speed estimated from the rotational speed of the wheel 3 and the axle 4. The condition change unit 102 estimates a state of the mobile body 1 in accordance with a difference between the actual moving speed and the assumed speed. The moving speed can be calculated from drive information such as a vehicle speed pulse value. Further, the assumed speed can be estimated from the accelerator opening sensor, the vehicle speed sensor, and the like. Thus, the condition change unit 102 can determine a state of the mobile body 1 based on drive information. When a difference between the actual moving speed and the assumed speed is large, the condition change unit 102 determines that the mobile body 1 is flying.

Further, the condition change unit 102 can determine a state of the mobile body 1 based on the altitude indicated by position information from the GPS unit. For example, the condition change unit 102 can determine that the mobile body 1 is flying when the altitude indicated by position information is higher than the elevation of the place of the mobile body 2 by a certain height or more. Note that the condition change unit 102 may determine whether or not the mobile body 1 is flying based on the altitude indicated by altitude information.

Further, the condition change unit 102 can determine a state of the mobile body 1 based on weight information of the axle 4. For example, when the mobile body 1 is flying, the wheels 3 are not in contact with a road surface. On the other hand, when the mobile body 1 is traveling on a road surface, the wheels 3 are in contact with a road surface. Therefore, the axle weight greatly changes in accordance with whether the mobile body 1 is flying or traveling. When the axle weight becomes less than a certain weight, the condition change unit 102 determines that the mobile body 1 is flying. The condition change unit 102 can determine whether the mobile body 1 is flying or traveling based on the axle weight. Further, during taking off and landing, the axle weight changes in accordance with the lift of the rotary wings 5. Therefore, the condition change unit 102 can accurately determine whether or not the mobile body 1 is taking off and landing based on the axle weight.

As described above, the condition change unit 102 determines a movement state of the mobile body 1 including taking off and landing. Then the condition change unit 102 switches an event detection condition in accordance with the movement state of the mobile body 1 including taking off and landing. For example, the movement state of the mobile body 1 including taking off and landing indicates that the mobile body 1 is traveling on the ground, flying in the air, or engaged in a takeoff and landing operation. For example, the condition change unit 102 determines whether the mobile body 1 is traveling on the ground or the mobile body 1 is flying after it is taken off. The condition change unit 102 determines whether the mobile body 1 is flying in the air or the mobile body 1 is traveling after it is landed. The condition change unit 102 may determine whether the mobile body 1 is in a takeoff operation or a landing operation in addition to determining whether it is flying or traveling. Thus, the condition change unit 102 can set an event detection condition in accordance with the movement state.

Examples of the event detection conditions will be described below. For example, the condition change unit 102 sets event detection conditions described below in the event detection unit 101 in each of the following cases: a case where the mobile body 1 is traveling, a case where the mobile body 1 is flying, and a case where the mobile body 1 is taking off and landing.

In a case where the mobile body 1 is traveling, the following matters (1) and (2) are set as the event detection conditions.

(1) Detection of a sudden deceleration or acceleration of the mobile body 1

(2) Detection of an impact on the mobile body 1

Note that the event detection conditions (1) and (2) are determined based on acceleration information from the acceleration sensor 151. For example, when the acceleration has changed by a certain amount within a predetermined period of time, it is determined that the mobile body 1 has suddenly decelerated or accelerated, and hence the event detection unit 101 detects an event. Further, when the amount of acceleration is momentarily greatly increased, the event detection unit 101 detects an impact such as a collision.

In a case where the mobile body 1 is traveling, the event detection unit 101 detects the occurrence of an event in accordance with the above event detection conditions. When the event detection unit 101 detects the occurrence of the events (1) and (2), it causes the event video image recording unit 110 to record event video image data.

In a case where the mobile body 1 is flying, the following matters (3) to (5) are set as the event detection conditions in addition to the event detection conditions (1) and (2) for traveling.

(3) Detection of a sudden change in the altitude of the mobile body 1

(4) Detection of approaching of a nearby object (another air vehicle, a bird, etc.) of the mobile body 1

(5) Detection of a sudden change in the barometric pressure near the mobile body 1

The event detection condition (3) is determined based on altitude information from the GPS unit 152 and the altitude sensor 154. When the altitude has changed by a certain value or more within a predetermined period of time (e.g., when the altitude has changed by five meters or more within five seconds), it is determined that the mobile body 1 has fallen or risen suddenly, and hence the event detection unit 101 detects an event. In such a case, the event detection unit 101 detects the occurrence of an event and causes the event video image recording unit 110 to record event video image data. When the mobile body 1 suddenly descends due to a gust of wind caused by a change in the barometric pressure or a decrease in the lift force, the flying posture of the mobile body 1 may be significantly affected. Therefore, when a sudden change in the altitude has occurred, the event video image recording unit 110 can record video image data as circumstantial evidence. By analyzing video image data etc., it is possible to contribute to the prevention of accidents and the ensuring of a stable flight.

The event detection condition (4) is determined, for example, based on range information of the range sensor 158. When a nearby object approaches an area within a predetermined distance from the mobile body 1, the event detection unit 101 detects that the nearby object is approaching. For example, it is possible to detect that another air vehicle, a bird, or the like is approaching the mobile body 1.

Alternatively, the event detection unit 101 may detect that the nearby object is approaching when the communication unit 120 receives a radio signal from a ground base station that performs ground control. For example, the ground base station grasps the current positions and the moving directions of a plurality of air vehicles by referring to a dynamic map. When two or more air vehicles approach on the dynamic map, the ground base station transmits approach signals to the air vehicles. Thus, the event detection unit 101 can detect that another mobile body is approaching the mobile body 1 based on a radio signal.

As described above, when another air vehicle or the like approaches the mobile body 1, the event detection unit 101 detects the occurrence of an event. The event detection unit 101 detects the occurrence of an event and causes the event video image recording unit 110 to record event video image data.

The event detection condition (5) is determined, for example, based on barometric pressure information from the barometric pressure sensor 155. For example, when the barometric pressure has changed by a certain value or more within a predetermined period of time (e.g., when the barometric pressure has changed by 1.6 hPa or more within 10 minutes), it is determined that a sudden change in the barometric pressure has occurred, and hence the event detection unit 101 detects an event. For example, when the mobile body 1 has entered turbulence, the event detection unit 101 detects the occurrence of an event. Alternatively, when the ground base station detects turbulence, it transmits a radio signal to the mobile body 1. The event detection unit 101 may detect the change in the barometric pressure based on the radio signal.

In a case where the mobile body 1 is flying, the event detection unit 101 detects the occurrence of an event in accordance with the above event detection conditions. Further, when the event detection unit 101 detects an event, the event detection unit 101 causes the event video image recording unit 110 to record event video image data. The flying posture of the mobile body 1 may be significantly affected by a gust of wind or a decrease in the lift caused by a change in the barometric pressure. Therefore, when a sudden change in the atmospheric pressure has occurred, the event video image recording unit 110 can record video image data as circumstantial evidence. By analyzing video image data etc., it is possible to contribute to the prevention of accidents.

In a case where the mobile body 1 is taking off and landing, the following event detection condition (6) is set in addition to the above event detection conditions (1) to (5).

(6) Detection of an abnormal posture of the mobile body 1

The event detection condition (6) is determined based on, for example, posture information from the posture sensor 157. For example, when the posture has changed by a certain amount or more within a predetermined period of time (e.g., when the angle of at least one of a roll axis, a pitch axis, and a yaw axis has changed by 30 degrees or greater within five seconds), it is determined that the mobile body 1 is in an abnormal posture, and hence the event detection unit 101 detects an event. When, for example, the mobile body 1 has turned or tilted sharply when it takes off or lands, the event detection unit 101 detects the occurrence of an event. Alternatively, when the angle of the roll axis is large and the mobile body 1 is not horizontal in the left/right direction, the event detection unit 101 determines that the mobile body 1 is in an abnormal posture.

The condition change unit 102 changes event detection conditions in accordance with the movement state of the mobile body 1. When the movement state matches the event detection condition changed in accordance with the movement state, the event detection unit 101 detects an event. Therefore, event video image data can be appropriately detected in accordance with the movement state. The recording apparatus 10 can appropriately record event video image data in all cases where the mobile body 1 is traveling, flying, and taking off and landing.

Needless to say, the event detection conditions are not limited to the examples of the above event detection conditions (1) to (6). In each of the movement states, some of the event detection conditions may not be set, and event detection conditions may differ between the movement states. Further, even when the same event detection condition is set in the movement states, a threshold setting of the event detection condition may differ for each movement state. For example, in the event detection condition (1), a threshold for detecting a sudden acceleration and a sudden deceleration in a case where the mobile body 1 is flying may be different that in a case where the mobile body 1 is traveling. Further, the event detection condition when the mobile body 1 takes off may be different from that when the mobile body 1 lands.

Specifically, in a case where the mobile body 1 is traveling, thresholds for the following event detection conditions are set.

(1) Detection of a sudden deceleration or acceleration of 7 mm/$s^2$ or greater (2) Detection of an impact of 0.8 G (7.84 m/$s^2$) or greater on the mobile body 1

Note that, in a case where the mobile body 1 is traveling, thresholds other than the above ones may be set.

Specifically, in a case where the mobile body 1 is flying, thresholds for the following event detection conditions are set.

(1) Detection of a sudden deceleration or acceleration of 14 m/$s^2$ or greater (2) Detection of an impact of 1.4 G (13.72 m/$s^2$) or more on the mobile body 1

(3) Detection of a sudden change in the altitude of 1.524 m/s or greater (4) Detection of approaching of a nearby object (another air vehicle, a bird, etc.) within less than 50 m of the mobile body 1

(5) Detection of a sudden change in the barometric pressure of 2 hPa/min or greater Note that, in a case where the mobile body 1 is flying, thresholds other than the above ones may be set.

Specifically, in a takeoff and landing operation, thresholds for the following event detection conditions are set.

(1) Detection of a sudden deceleration or acceleration of 7 m/$s^2$ or greater (2) Detection of an impact of 1.2 G (11.76 m/$s^2$) or greater on the mobile body 1

(3) Detection of a sudden change in the altitude of 1 m/s or greater (4) Detection of approaching of a nearby object (another air vehicle, a bird, etc.) within less than 25 m of the mobile body 1

(5) Detection of a sudden change in the barometric pressure of 1.6 hPa/min or greater (6) Detection of an abnormal posture of 15 degrees or greater in at least one of a roll angle, a pitch angle, and a yaw angle Note that, in a takeoff and landing operation, thresholds other than the above ones may be set.

Further, determination criteria for (3) Detection of a sudden change in the altitude, (5) Detection of a sudden change in the barometric pressure, and (6) Detection of an abnormal posture are not limited to the above values. For example, appropriate values can be set as determination criteria in accordance with an airframe performance and the size of the mobile body, the accuracy of detection of the sensor, etc.

Further, a driver or a passenger can record video image data of scenery during flight. For example, a driver or a passenger inputs a scenery recording by operating a touch panel (not shown) of a display. Then the event detection unit 101 causes the event video image recording unit 110 to record event video image data by using a user operation of the scenery recording as an event detection condition.

Figure 3:
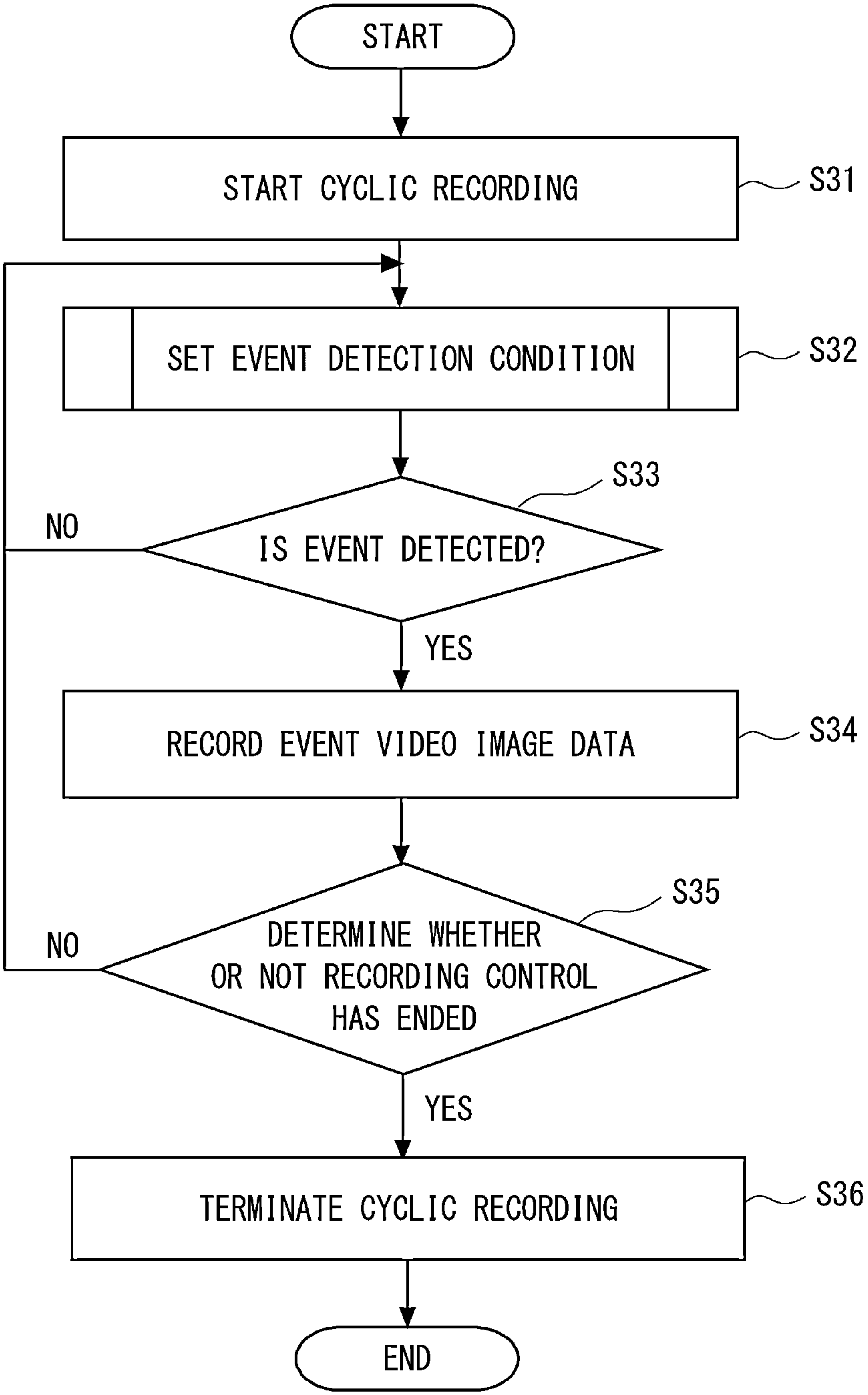
FIG. 3 is a flowchart showing a recording control method.

Next, a recording control method using the recording control apparatus 100 according to this embodiment will be described with reference to FIG. 3. FIG. 3 is a flowchart showing the recording control method.

First, the recording control apparatus 100 starts a cyclic recording (S31). For example, when the camera 130 captures an image of an area including the periphery of the mobile body 1, the video image data acquisition unit 103 acquires video image data from the camera 130. Then the buffer memory 104 cyclically records the video image data.

Next, the condition change unit 102 sets an event detection condition based on the movement state of the mobile body 1 including taking off and landing (S32). For example, the condition change unit 102 determines whether the mobile body 1 is flying, traveling, or taking off and landing based on altitude information, weight information, and the like of the mobile body 1. Then the condition change unit 102 selects an event detection condition from among preset event detection conditions based on the state of the mobile body 1 and sets the selected event detection condition.

The event detection unit 101 detects an event in accordance with the set event detection condition (S33). When no event is detected (NO in S33), the process returns to Step S32, and the condition change unit 102 sets an event detection condition.

When the event is detected (YES in S33), the event video image recording unit 110 records event video image data (S34). That is, video image data recorded in the buffer memory 104 before and after the event detection unit 101 detects an event as event video image data is recorded in the event video image recording unit 110 which is a recording area which is not overwritten.

Next, the recording control apparatus 100 determines whether or not the recording control has ended (S35). When the recording control apparatus 100 determines that the recording control has ended (YES in S35), the recording control apparatus 100 terminates the cyclic recording (S36). As a result, the process is ended. When, for example, the mobile body 1 stops or a driver gets out of the mobile body 1, the recording control apparatus 100 terminates the recording control. When the recording control apparatus 100 determines that the recording control has not ended (NO in S35), the process returns to Step S32, and the condition change unit 102 sets an event detection condition. Then the above processes are repeated.

Figure 4:
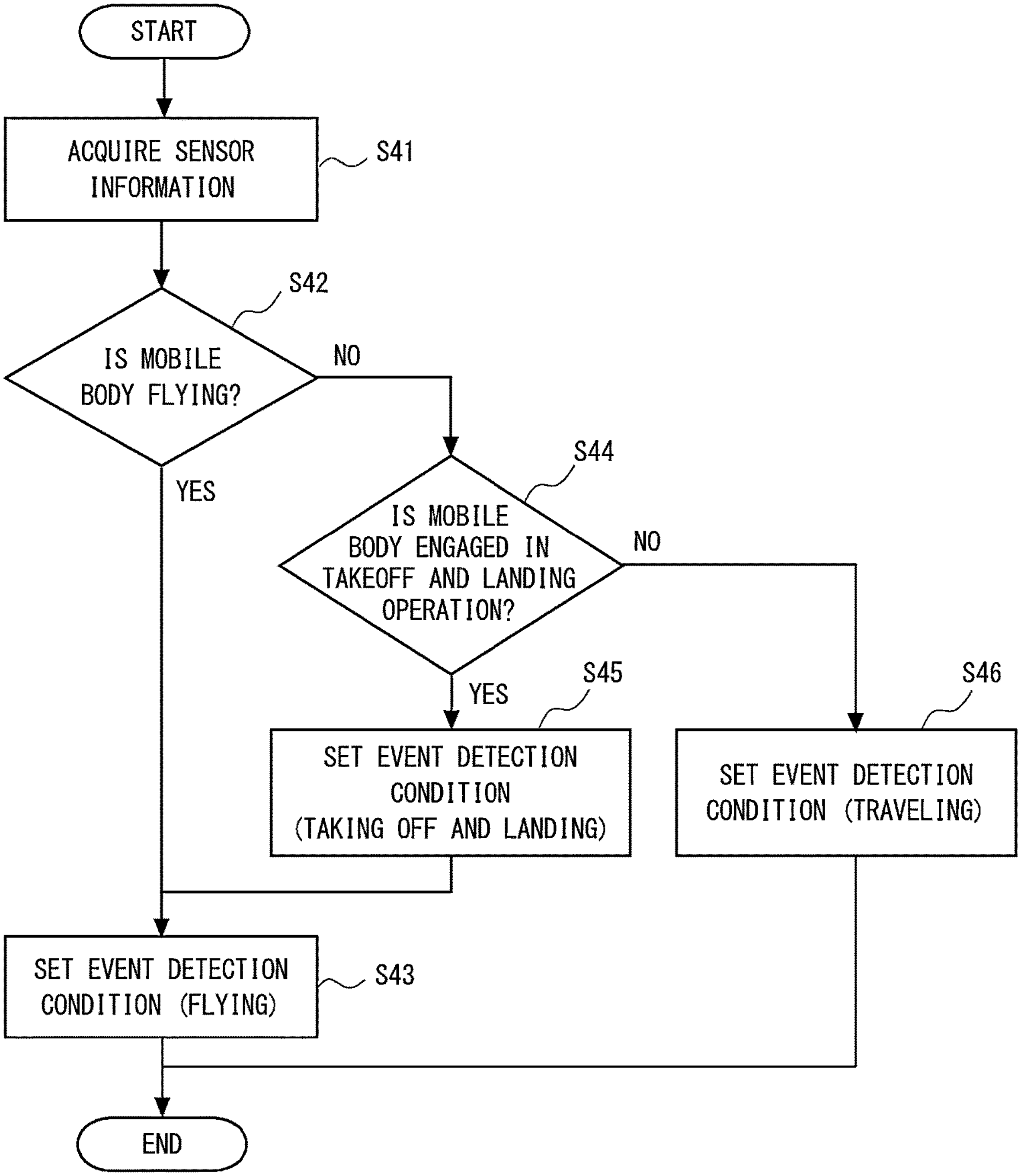
FIG. 4 is a flowchart showing processing for changing an event detection condition.

FIG. 4 is a flowchart showing details of processing for setting event detection conditions in Step S32.

First, the event detection unit 101 acquires sensor information from the sensor unit 150 (S41). The sensor information includes weight information, position information, altitude information, barometric pressure information, and the like as described above. Next, the condition change unit 102 determines whether or not the mobile body 1 is flying (S42). The condition change unit 102 determines whether or not the mobile body 1 is flying based on the sensor information such as altitude information, position information, or weight information. For example, the condition change unit 102 determines that the mobile body 1 is flying in the air when the altitude of the mobile body 1 is equal to or higher than a certain altitude.

When the mobile body 1 is flying (YES in S42), the condition change unit 102 sets event detection conditions for flying (S43). Note that, as described above, the condition regarding the altitude etc. are used as the event detection conditions.

When the mobile body 1 is not flying (NO in S42), the condition change unit 102 determines whether or not the mobile body 1 is engaged in a takeoff and landing operation (S44). The condition change unit 102 determines whether or not the mobile body 1 is engaged in a takeoff and landing operation based on sensor information such as weight information, position information, altitude information, range information, and barometric pressure information. For example, when the distance between the mobile body 1 and the ground is less than a predetermined distance and the weight of the axles 4 is equal to or less than a predetermined weight, the condition change unit 102 determines that the mobile body 1 is engaged in a takeoff and landing operation. Alternatively, the condition change unit 102 may determine whether or not the mobile body 1 is engaged in a takeoff and landing operation based on the rotational speed of the rotary wings and the like.

When the mobile body 1 is engaged in a takeoff and landing operation (YES in S44), the condition change unit 102 sets event detection conditions for taking off and landing (S45). Note that, as described above, the condition regarding the posture etc. are used as the event detection conditions.

When the mobile body 1 is not taking off and landing (NO in S44), the condition change unit 102 sets event detection conditions for traveling (S46). Note that, as described above, the condition regarding the acceleration etc. are used as the event detection conditions. In this way, the recording control apparatus 100 can switch the event detection conditions in accordance with the movement state of the mobile body 1. Therefore, the recording apparatus 10 can appropriately store event video image data.

Further, the above-described program can be stored and provided to a computer using any type of non-transitory computer readable media. Non-transitory computer readable media include any type of tangible storage media. Examples of non-transitory computer readable media include magnetic storage media (e.g., hard disk drives), optical magnetic storage media (e.g., magneto-optical disks), CD-ROM (Compact Disc-ROM), CD-R (CD-Recordable), CD-R/W (CD-ReWritable), DVD-ROM (Digital Versatile Disk-ROM), and semiconductor memories (such as mask ROM, PROM (Programmable ROM), EPROM (Erasable PROM), flash ROM, RAM, etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires and optical fibers) or a wireless communication line.

Note that the present disclosure is not limited to the above-described embodiments and may be changed as appropriate without departing from the scope and spirit of the present disclosure.

What is claimed is:

1. A recording control apparatus comprising:

a video image data acquisition unit configured to acquire video image data obtained by capturing an image of an area including a periphery of a mobile body which flies and travels on land;

an event detection unit configured to detect an event that has occurred and record the video image data at a time of the detection of the event as event video image data in a recording unit in accordance with a predetermined condition; and a condition change unit configured to change the predetermined condition depending on whether the mobile body is traveling or flying, wherein the condition change unit sets following event detection condition (1) or (2) as a predetermined condition when the mobile body is traveling, and sets the following event detection conditions (3), (4), and (5) as predetermined conditions in addition to the following event detection condition (1) or (2) when the mobile body is flying:

(1) Detection of a sudden deceleration or acceleration of the mobile body;

(2) Detection of an impact on the mobile body;

(3) Detection of a sudden change in an altitude of the mobile body;

(4) Detection of approaching of an object present in the periphery of the mobile body; and (5) Detection of a sudden change in a barometric pressure near the mobile body.

2. The recording control apparatus according to claim 1, wherein the condition change unit changes a threshold of the event detection condition (1) or (2) depending on whether the mobile body is traveling or flying.

3. A recording control apparatus comprising:

a video image data acquisition unit configured to acquire video image data obtained by capturing an image of an area including a periphery of a mobile body which flies;

an event detection unit configured to detect an event that has occurred and record the video image data at a time of the detection of the event as event video image data in a recording unit in accordance with a predetermined condition; and a condition change unit configured to change the predetermined condition depending on whether the mobile body is flying or engaged in a takeoff and landing operation, wherein the condition change unit sets following event detection conditions (1) to (5) as predetermined conditions when the mobile body is flying, and sets the following event detection condition (6) as a predetermined condition in addition to the following event detection conditions (1) to (5) when the mobile body is engaged in a takeoff and landing operation:

(1) Detection of a sudden deceleration or acceleration of the mobile body;

(2) Detection of an impact on the mobile body;

(3) Detection of a sudden change in an altitude of the mobile body;

(4) Detection of approaching of an object present in the periphery of the mobile body;

(5) Detection of a sudden change in a barometric pressure near the mobile body; and (6) Detection of an abnormal posture of the mobile body.

4. The recording control apparatus according to claim 3, wherein the condition change unit changes thresholds of the event detection conditions (1) to (5) depending on whether the mobile body is flying or engaged in a takeoff and landing operation.

5. A recording control apparatus comprising:

a video image data acquisition unit configured to acquire video image data obtained by capturing an image of an area including a periphery of a mobile body which flies and travels on land;

an event detection unit configured to detect an event that has occurred and record the video image data at a time of the detection of the event as event video image data in a recording unit in accordance with a predetermined condition; and a condition change unit configured to change the predetermined condition depending on whether the mobile body is traveling, flying, or engaged in a takeoff and landing operation, wherein the condition change unit sets following event detection condition (1) or (2) as a predetermined condition when the mobile body is traveling, sets the following event detection conditions (3), (4), and (5) as predetermined conditions in addition to the following event detection condition (1) or (2) when the mobile body is flying, and sets the following event detection condition (6) as a predetermined condition in addition to the following event detection conditions (1) to (5) when the mobile body is engaged in a takeoff and landing operation:

(1) Detection of a sudden deceleration or acceleration of the mobile body;

(2) Detection of an impact on the mobile body;

(3) Detection of a sudden change in an altitude of the mobile body;

(4) Detection of approaching of an object present in the periphery of the mobile body;

(5) Detection of a sudden change in a barometric pressure near the mobile body; and (6) Detection of an abnormal posture of the mobile body.

6. The recording control apparatus according to claim 5, wherein the condition change unit changes a threshold of the event detection condition (1) or (2) depending on whether the mobile body is traveling or flying, and changes thresholds of the event detection conditions (1) to (5) depending on whether the mobile body is flying or engaged in a takeoff and landing operation.

* * * * *